United States Patent
Joseph et al.

(10) Patent No.: US 8,723,348 B2
(45) Date of Patent: May 13, 2014

(54) BATTERY ASSEMBLY WITH KINETIC ENERGY-BASED RECHARGING

(75) Inventors: Daniel M. Joseph, Los Angeles, CA (US); Marina C. Joseph, Los Angeles, CA (US); Thomas R. Keiser, Jr., Los Angeles, CA (US); Bryan H. Keiser, Hermosa Beach, CA (US)

(73) Assignee: Ideation Designs LLC, Los Angeles, CA (US)

( * ) Notice: Subject to any disclaimer, the term of this patent is extended or adjusted under 35 U.S.C. 154(b) by 220 days.

(21) Appl. No.: 13/162,271

(22) Filed: Jun. 16, 2011

(65) Prior Publication Data
US 2012/0319404 A1     Dec. 20, 2012

(51) Int. Cl.
*B60L 11/12*     (2006.01)
*H02P 9/04*      (2006.01)

(52) U.S. Cl.
USPC .......................................... 290/50; 290/1 R

(58) Field of Classification Search
CPC ........ H02K 33/16; H02K 35/02; F21L 13/06; F21Y 2010/02
USPC .................................................. 290/1 R, 50
See application file for complete search history.

(56) References Cited

U.S. PATENT DOCUMENTS

| | | | |
|---|---|---|---|
| 6,220,719 B1 * | 4/2001 | Vetorino et al. | 362/192 |
| 7,768,160 B1 * | 8/2010 | Sahyoun | 310/14 |
| 8,193,781 B2 | 6/2012 | Lin et al. | |
| 2003/0232627 A1 * | 12/2003 | Tu et al. | 455/550.1 |
| 2007/0278902 A1 * | 12/2007 | Rastegar et al. | 310/339 |
| 2008/0218128 A1 * | 9/2008 | Kim | 320/137 |

* cited by examiner

*Primary Examiner* — Tulsidas C Patel
*Assistant Examiner* — Thomas Quigley
(74) *Attorney, Agent, or Firm* — Marsh Fischmann & Breyfogle LLP; Kent A. Lembke

(57) ABSTRACT

A mobile electronic device configured to recharge when oscillated. The electronic device includes a housing with a battery compartment and a battery assembly positioned within the battery compartment. The battery assembly includes a rechargeable storage battery connected to device's battery contacts. The battery assembly includes a charging assembly connected to the rechargeable storage battery, and the charging assembly provides a kinetic energy-based generator operating during the oscillating motion of the electronic device to output electrical current to the rechargeable storage battery. The generator includes: (a) a barrel; (b) a permanent magnet positioned in an elongated chamber of the barrel and sliding within the chamber during movement of the device; and (c) a coil of conductive wire wrapped around an outer surface of the barrel. The chamber, generator magnet, and barrel outer surface receiving the coil all may be non-circular in cross sectional shape or non-cylindrical to improve kinetic energy harvesting.

23 Claims, 10 Drawing Sheets

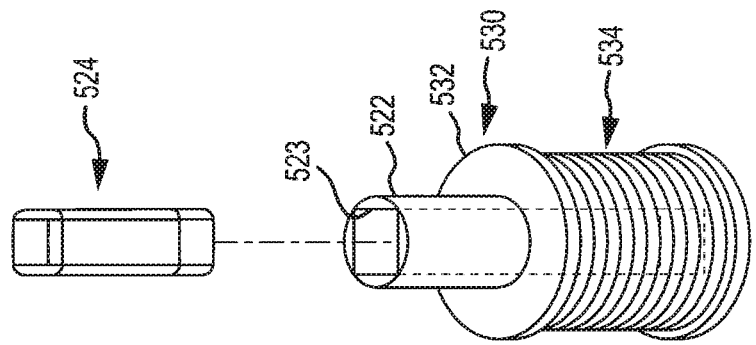
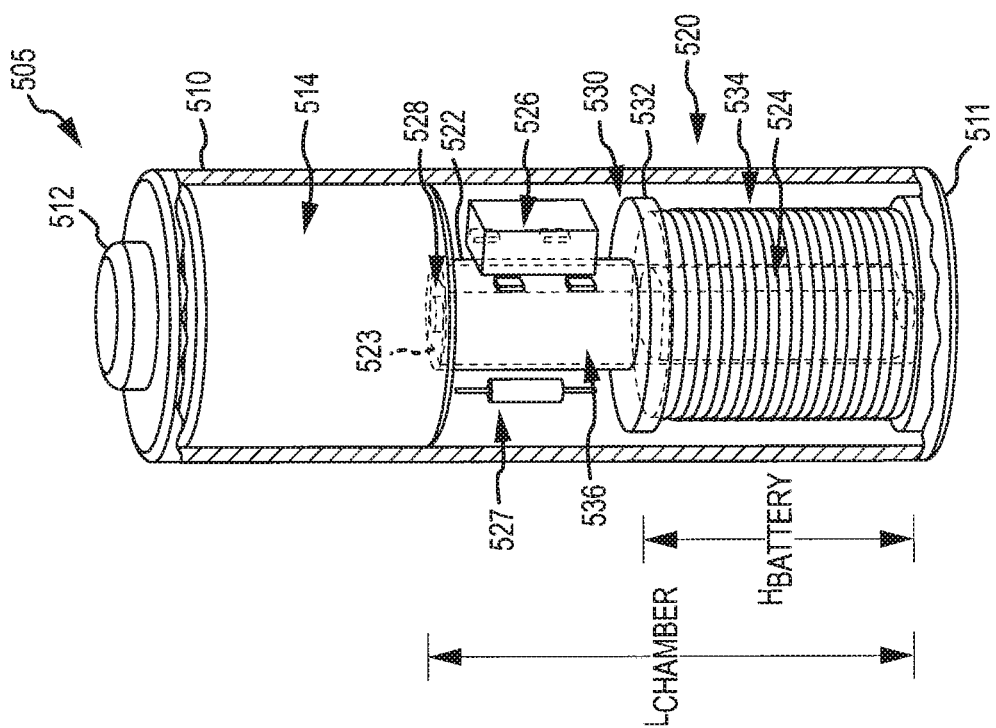

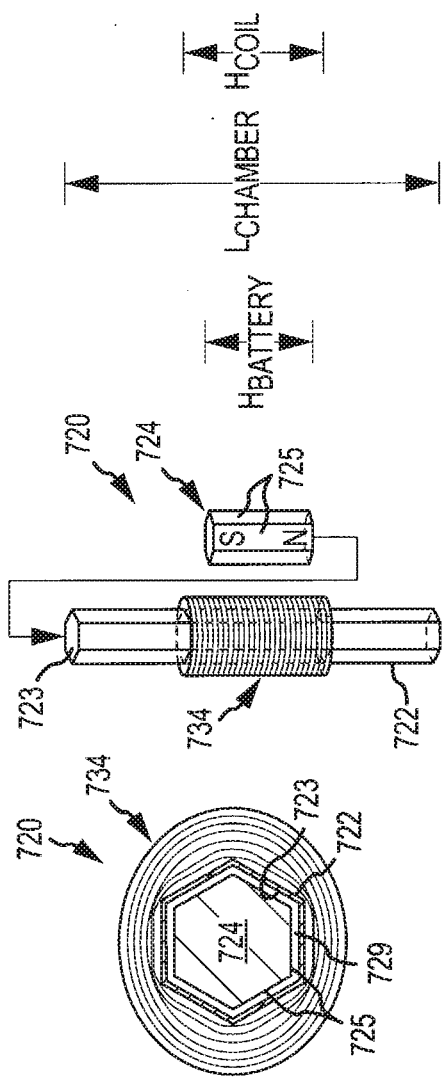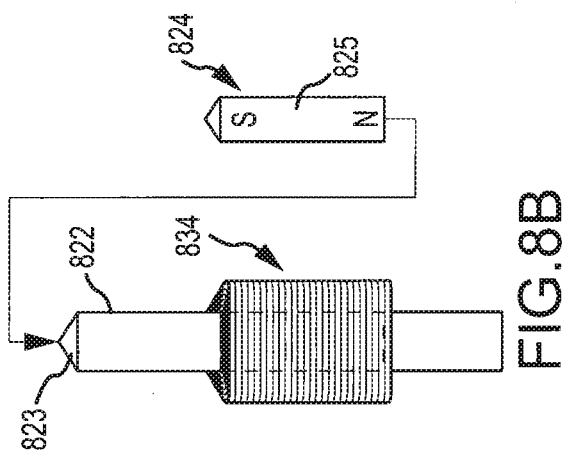

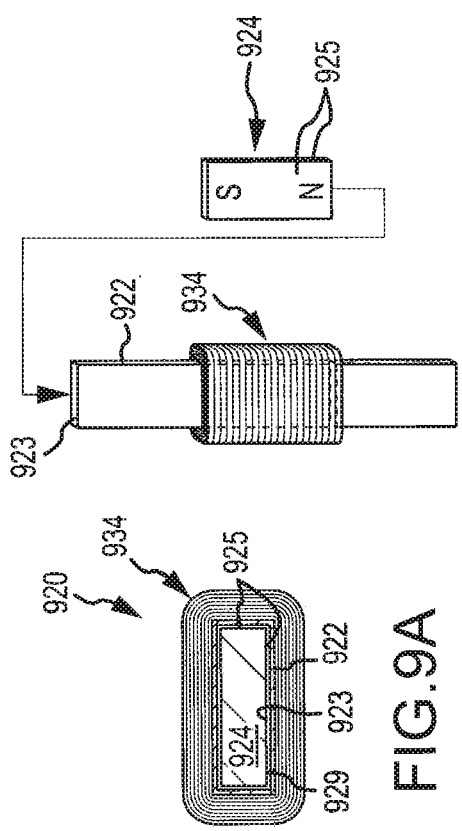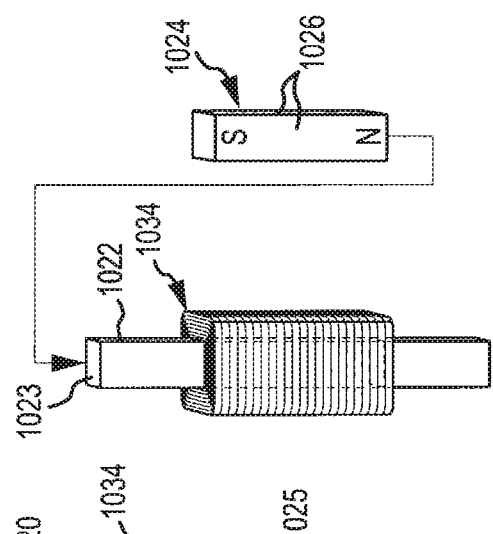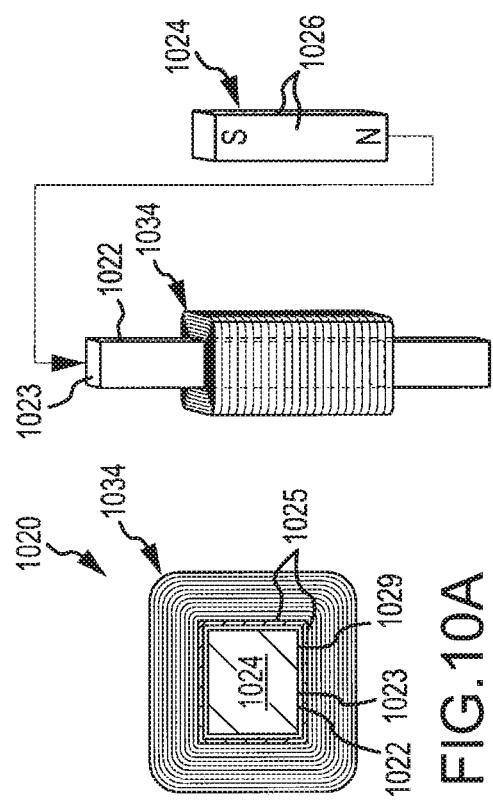

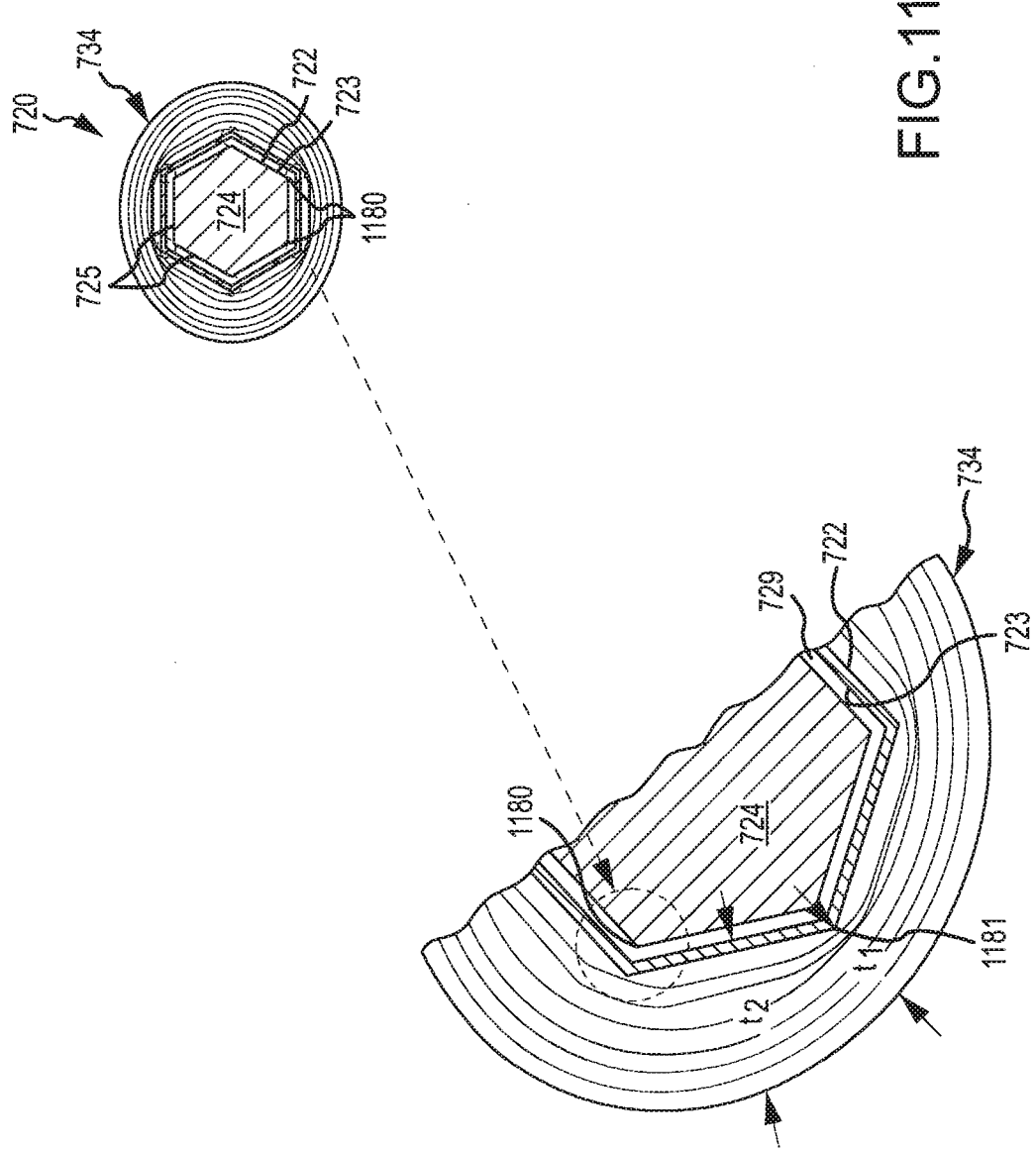

BATTERY ASSEMBLY WITH KINETIC ENERGY-BASED RECHARGING

BACKGROUND

1. Field of the Description

The present description relates, in general, to batteries and/or general power supplies/sources including replacement of rechargeable and non-rechargeable batteries with a device that continuously provides power or at least provides an extended/extendable life. More particularly, the present description relates to a battery assembly that may be used in nearly any electronic device, such as a mobile phone, a digital camera, a portable audio device, or the like, to replace traditional batteries. Briefly, the battery assembly is configured to harvest kinetic energy or power to generate electricity and charge a rechargeable battery.

2. Relevant Background

Today's world is full of electronic devices as everyone seems to be continuously using, or at least carrying, these devices to stay connected with other people and world events, to capture their experiences, and for nearly continuous entertainment. The trend is toward more and more digital devices being used by people in both developed and developing countries. These electronic devices include, but are not limited to, mobile or cell phones, global positioning satellite (GPS) devices, portable audio devices, video games, portable/personal computing devices such as tablets and pads, and digital cameras.

While providing great convenience and connectivity, an ongoing problem with the use of electronic devices is how best to power them on an ongoing basis and while their users are themselves mobile. Most portable electronic devices are powered, at least periodically, with onboard batteries. Due to cost and environmental concerns, traditional disposable (or non-rechargeable) batteries are being replaced in large part by rechargeable batteries. Also, significant efforts have been made to increase the life of batteries.

Unfortunately, though, a number of issues still face the designers and users of portable electronic devices. An issue with all of these devices is that the more people use and rely on them the more quickly they use up the power stored in their batteries and "go dead" often when the device is needed the most. For example, a mobile phone may lose battery life when a motorist is stranded on a remote highway. Battery technology in general has not changed in over fifteen years. The size and capacity ratio to power density has stayed the same while the devices these batteries power have gotten progressively smaller. Thus, a wall or hurdle will soon be reached at which point electronic devices will be limited in their size (e.g., cannot be made any smaller) due to battery capacity restraints and not due to manufacturing/design issues.

Recharging technologies are also improving but, for the most part, each requires that the user plug their device into a wall socket or remove the battery and place the battery into a charger that is plugged into a wall socket. As a result, users of portable electronic devices are tethered to walls (or automobiles) as the only effective way to bring their devices back to life or a full power state. Further, each device may have a different charger such that the user is carrying or using multiple charging devices, which can be lost or misplaced.

These recharging techniques and devices are cumbersome as well as only providing a stop gap resolution to the ongoing problem that the power bar or battery indicator on each electronic device is always moving toward a low or no power state until the device is again plugged in to an external power source. This is a frustration for many users because the devices may be used all day without the users returning to a location where recharging is possible. The electronic devices are designed and intended to provide mobility and are hand/pocket size so that they can be carried on one's person at all times, which has led to the development of many holsters and similar devices to facilitate carrying these devices in a hands-free manner. However, the mobile design intent is hindered by forcing users to only recharge with a car electric system or with a wall-mounted charger/socket.

There have been many attempts at developing alternative battery chargers that would support a more mobile use and recharging. For example, some chargers have been developed that make use of solar energy in a battery charging device. While desirable from the point of a renewable energy source, solar technology chargers are often standalone or separate devices that are the size of the electronic device they are used to charge, which makes them an added and often undesirable burden for the device users or consumer. Specifically, the user has to carry two devices rather than one (similar to many wall-type chargers). Further, solar chargers typically only work, well in bright sunlight, which makes them only sporadically useful (e.g., not useful when raining or as useful on overcast days) and not useful at all during portions of each day (e.g., nighttime).

Another device that may be used as a battery charger is the crank dynamo-based charger. These have not been widely adopted in part because they have a relatively large form factor such as at least as large as the device they are being used to charge. Additionally, charging only occurs while the crank is being vigorously rotated or cranked, which can be impractical for many users (e.g., cannot charge while using hands for any other activity such as talking on a mobile phone). In other words, the user must stop what they are doing and crank on the charger until the battery in the device is again at usable power levels. A further limitation with such chargers is that there are many points of failure, such as gear drives that may take the form of nylon interlocking gears, which may require periodic maintenance or replacement of parts or the chargers.

Hence, there remains a need for improved methods and devices for recharging batteries that are used in existing and to-be-developed, portable or mobile electronic devices. An issue with both solar and dynamo-based charging devices is the fact that they present a relatively large separate device that the user must carry around with them to be able to charge their batteries or devices. Another issue with these and wall socket/car electric system-based chargers is that the user has to actively operate them or otherwise stop using the mobile device as intended (e.g., in a mobile manner). The user cannot simply affect charging while they are living their life as normal and performing typical daily activities such as walking down the street or through an airport or mall. With these issues in mind, it would be preferable that the new charging devices and methods be designed to have a minimal additional form factor or even work within the form factor of the original electronic device and be designed to provide recharging power (or electricity) without extraordinary user intervention or action (e.g., the device may be used as a mobile device and the user may carry out typical daily activities).

SUMMARY

To address the above and other needs, the present description describes a battery assembly (and personal/mobile electronic devices including such an assembly) that includes a rechargeable battery and charging assembly. The charging assembly is configured to convert kinetic and/or potential energy into electricity (e.g., harvest kinetic energy) that can be used to charge the rechargeable battery. The battery assembly may be designed to have a form factor similar to existing batteries of electronic devices such as a thin, rectangular shape as common in many mobile phones or a cylindrical shape common for AA, AAA, and similar batteries.

In this regard, the battery assembly may be thought of as a battery replacement for traditional rechargeable and non-rechargeable batteries that is able to create electricity from human motion while presenting an extremely small form factor. The charging assembly or mechanism can create electricity both from intentional motion (e.g., shaking the mechanism back and forth in an oscillating manner) and unintentional or indirect motion (e.g., a user holding/carrying an electronic device with the battery assembly performing an activity such as walking, running, riding a bike, and other typical daily activities performed by users of electronic devices).

The kinetic energy-harvesting charging assembly uses the theory behind Faraday's law of induction to create the power and/or electricity useful for charging a battery. Briefly, Faraday's law states that when magnetic forces are changed an electric current can be created, and the amount of current that can be created is also directly related to the change in the magnetic field and the size of the field. Hence, when the magnetic field increases in magnitude so does the amount of voltage that can be created. This is typically called magnetic flux, which is equal to the surface area of the magnetic field multiplied by the strength of the field.

In the past, others have made attempts to produce Faraday-based charging devices, but these have not been widely adopted and have not met the demand of makers and users of personal electronic devices. Prior Faraday-based charging devices are typically relatively large such that they cannot be used within existing devices as a replacement for traditional batteries (e.g., their form factor is much larger than that of existing batteries). As a result, these devices are similar to existing chargers such as dynamo-based chargers that have to be carried about separately by the user and then periodically connected to the device such as during exercise to oscillate the charger.

The inventors have recognized that prior Faraday-based chargers have to be relatively large in size to provide useful amounts of electricity, and the inventors believe that this size limitation is caused, in part, by the use of cylindrical magnets. In a typical design, the cylindrical magnet is positioned, to be able to slide, within a cylindrical bore/chamber of bobbins/housings about which copper wirings are wrapped. The magnet moves relative to the windings when the charger is shaken or moved by its user, which causes electric current to flow in the windings/wires.

The inventors further recognized that use of a cylindrical magnet limits the amount of efficiency by limiting the amount of windings that can be provided in a small area, limits the shape of the charger (e.g., hard to fit a cylindrical device into a flat/rectangular electronic device housing), and limits the form factor in which these chargers can be fit. Another limiting aspect of these chargers is that they can only be actively charging a battery when they are actively and, often, rigorously shaken. Magnet movement may be facilitated by use of a mechanical spring, but the spring creates a mechanical failure point that can fatigue over time. In summary, these devices are plagued with large size constraints, usability problems (similar to a dynamo-based charger requiring user actions), and electrical and magnetic efficiencies, and these concerns have limited the development of Faraday-based chargers.

With these design flaws understood by the inventors, the charging assembles described herein generally make use of permanent magnets that are non-cylindrical in shape (i.e., do not have a circular cross section). Prototypes fabricated with elongate magnets having triangular, rectangular, and other multi-sided cross sectional shapes have been proven to provide much higher charging outputs than those obtained with a cylindrical magnet of similar size.

For example, a charging assembly was fabricated that included a barrel with a rectangular chamber or bore, and a bobbin or reel was provided on an external surface or portion of the barrel. Copper wire or any other non-ferrous, electrically conductive material was wound or wrapped about this bobbin, and the barrel and bobbin were fabricated of a non-conducting or non-ferrous material (e.g., a plastic, ceramic, glass, or the like). A permanent magnet with a flat rectangular shape was positioned within the chamber/bore and allowed to slide up and down the length of the chamber/bore with oscillations or shakes of the barrel. It was found that 200 shakes or steps provided a charging output of 0.25 volts at 220 mAh while 1200 shakes or steps provided 3.00 volts at 1320 mA (at a time of 6 minutes of jogging while carrying the charging assembly or otherwise shaking the assembly), which is significant as a survey of power specifications for existing mobile phones indicated an average power requirement or battery load of about 1360 mAh (or near to what one initial prototype provided during testing).

The inventors believe that one reason that non-cylindrical magnets are desirable is that there are more edges/corners providing thinner separations between the winding/copper and the moving magnet (less insulating or non-ferrous material between the windings and the magnet). The output may also be improved due to other design factors such as increased field strength, more area of wire/windings and magnet, and the like. With a polygonal shape, one can achieve a ratio of magnet to copper wire that is much closer to fifty percent each because the surface area a polygon can afford versus a cylinder. In manufacturing as well, it is much easier to injection mold a polygonal shape versus a cylindrical one. Because of this aspect, the walls of the bobbin can be manufactured much thinner, which allows the magnet closer proximity to the copper wire. The output may also be improved due to other design factors such as increased field strength, more area of wire/windings and magnet, and the like.

More particularly, an electronic device, such as mobile phone or other portable/personal electronic device, is provided that is adapted for generating and storing charge during oscillating motion (e.g., kinetic energy harvesting to provide ongoing recharging during typical daily activities of the device's user/owner). The electronic device includes a device housing with a battery compartment that includes battery contacts or leads of the electronic device and/or that are connected to loads of the device. The electronic device also includes a battery assembly positioned within the battery compartment.

The battery assembly has the form factor of a conventional battery that would typically have been positioned in the battery compartment, and the battery assembly includes a rechargeable storage battery connected to the battery contacts. For example, this may be a Li-ion battery or the like, and it may be about half the size as a conventional battery positioned within the battery compartment. The battery assembly also includes a charging assembly electrically connected to the rechargeable storage battery. The charging assembly including a kinetic energy-based generator operating during the oscillating motion of the electronic device to output electrical current to the rechargeable storage battery.

The kinetic energy-based generator may include: (a) a barrel with a chamber extending a length of the barrel; (b) a permanent magnet positioned in the chamber and sized and shaped to slide relatively freely within the chamber during the oscillating motion; and (c) a coil of electrically conductive wire wrapped around the barrel and the chamber. In operation, the permanent magnet travels in and out of an interior region of the coil as it slides in the chamber and, in response, the output electrical current is generated within the coil. Significantly, the chamber and the permanent magnet both have a non-circular cross sectional shape. The inventors found that more edges and sides created a more uniform wall thickness in manufacturing as well as affording a closer physical proximity between the magnet and the copper windings. This, in turn, yields much more energy in a smaller space or form factor. For example, the non-circular cross sectional shape of the chamber and the generator magnet may be one of a rectangle, a square, a triangle, a hexagon, or another polygon.

To achieve desirable current generation, the coil has a height as measured along an axis of the chamber and the permanent magnet has a height that is selected from the range of 70 to 100 percent of the coil height. Further, the chamber has a width and a thickness that are each about 0.005 to 0.010 inches greater in magnitude than a corresponding width and thickness of the permanent magnet (e.g., to provide very close proximity between the magnet and the coil). Similarly along these lines, the barrel has a sidewall defining the chamber, and the sidewall is formed of a nonferrous material that has a thickness along a bobbin section receiving the coil that is less than about $1/32$ inches thick. In some embodiments not only do the chamber and generator magnet have non-circular cross sections, but the sidewall at the bobbin section has cross sectional shape taken transverse to the axis of the chamber that is non-circular with corners and sides matching corners and sides of the chamber. In this way, the coil has a first thickness proximate to one of the corners that is less than a second thickness proximate to one of the sides.

In some embodiments, one void portion of the chamber is provided to receive the generator magnet as it slides out of the coil's interior region. In other cases, the chamber extends a portion of the length of the barrel such that the permanent magnet travels into a first void outside the interior region of the coil at one end of the coil and into a second void outside the interior region of the coil at a second end of the coil. In some preferred embodiments, the kinetic energy-based generator further includes spring magnets (one, two, or more) positioned at opposite ends of the chamber, and the spring magnets each are made up of permanent magnets with poles arranged to oppose poles of the permanent magnet in the chamber (e.g., like poles are positioned adjacent each other to cause a spring-like effect as the magnetic fields interact in the chamber as the generator magnet slides back and forth within the chamber). This methodology can also be created in other form factors and designs. The methods include, but are not limited to, rotational motion with induction and "gyroscope-like" motion with spin axis and motor.

To achieve useful and surprisingly good results for charging based on kinetic energy harvesting, the conductive wire of the coil may include at least 300 turns of No. 38 AWG or finer copper wire. Similarly, the coil is formed to have a height and the permanent magnet is chosen to have a particular height and gauss rating such that the output electrical current to the storage battery is at least about 1300 mAh at about 3 or more volts when the oscillating motion is at least about 1000 to 1200 shakes of the electronic device.

Because of the power density this device can achieve, it can be scaled up or down depending on the form factor criteria. Larger devices such as vehicles, tools, heavy machinery, and the like would likely benefit from larger versions of this invention (than shown and described in more detail in the detailed description and accompanying figures) and have the physical real estate to house the larger versions comfortably. In contrast, though, cellular phone, medical equipment, and apparel would necessitate or benefit from the more miniature versions of the described technology. All form factors, large or small, are considered a part of this invention and covered by this description and included claims, and each of these form factors for the battery replacement devices may achieve the described yield and would benefit from the same high power density.

BRIEF DESCRIPTION OF THE DRAWINGS

FIG. 5 is a perspective, partial cross sectional view of battery replacement assembly that is adapted for use in replacing a typical cylindrical battery such as a conventional AA or AAA battery;

FIG. 6 is an exploded view of a portion of the charger assembly of the battery replacement of FIG. 5;

FIGS. 7A-10B are pairs of sectional end views and exploded side views of four different embodiments of charging assemblies (or at least portions of exemplary kinetic energy-harvesting charging assemblies) showing a variety of battery cross sectional shapes and that may be used to practice the invention (and corresponding chamber and spool/bobbin shapes);

FIG. 11 illustrates the sectional end view of the charging assembly of FIG. 7A and an enlarge portion of this end view illustrating differing wire thicknesses of coil at corners of multisided generator magnet and corresponding chamber/bobbin corners.

DETAILED DESCRIPTION

Figure 1:
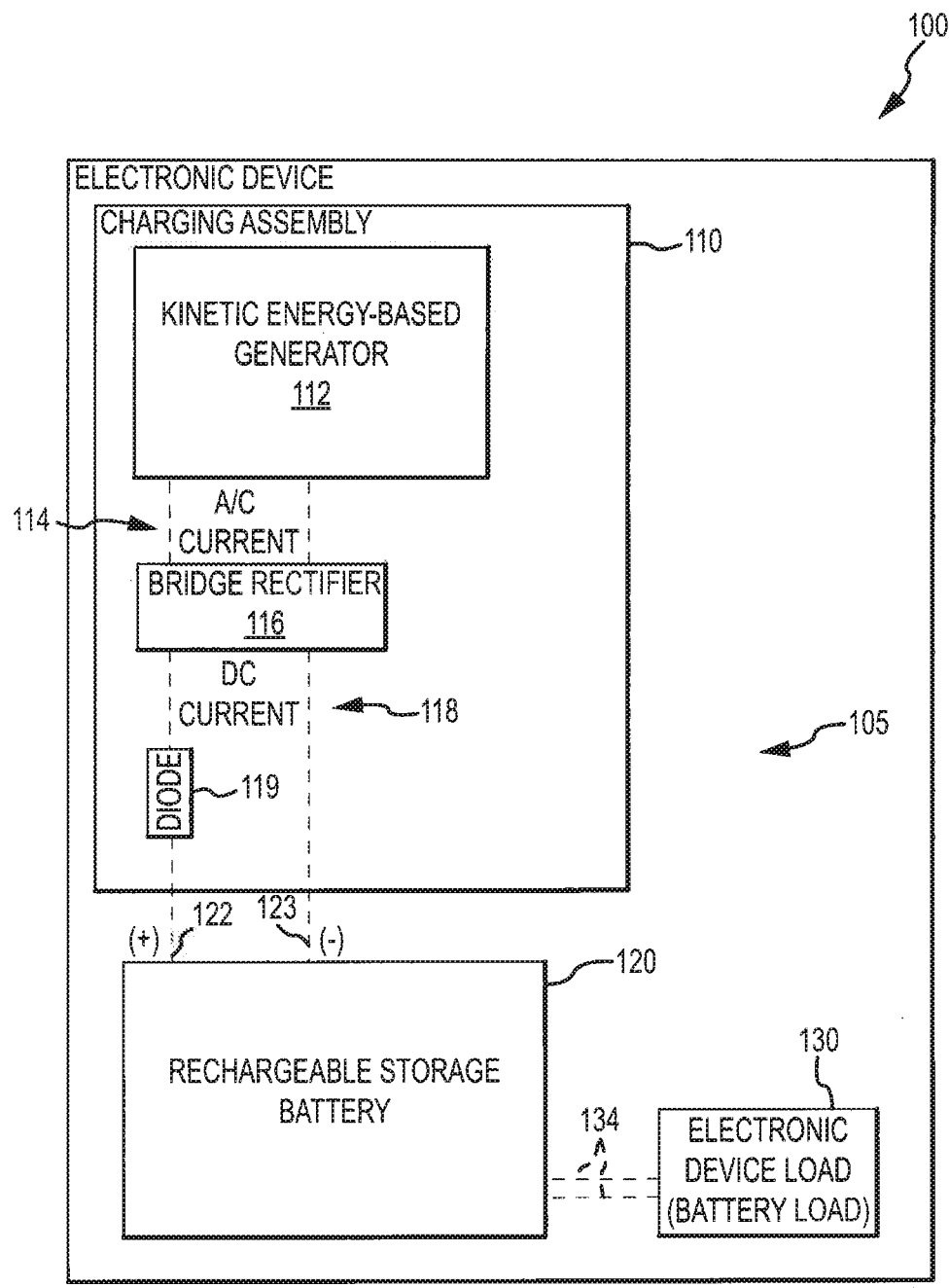
FIG. 1 is a functional block diagram of an electronic device that includes a battery assembly according to one embodiment of the invention with a rechargeable battery and a kinetic energy-harvesting charging assembly.

Briefly, embodiments taught in this description address the above described issues with prior battery chargers and attempted replacements for conventional batteries. Battery assemblies are presented herein that include kinetic energy-based charging assemblies that can be thought of as a battery replacement that can actively charge itself from benign or typical human activities.

Many of the embodiments are designed to fit into places (e.g., within a mobile/personal electronic device) of the same size constraints and form factors as regular rechargeable and non-rechargeable batteries. The batteries being "replaced" may include (but are not limited to or are scalable beyond) standard AA, AAA, 9V, D, C, proprietary rechargeable batteries for personal audio/visual devices, cell phone rechargeable batteries, and GPS-device rechargeable batteries. The battery assemblies typically will include a rechargeable battery and embodiments where the battery assembly is added to any of the above devices a battery is provided that will charge itself. The method of charging is a direct result of both unintentional human motion (such as walking from meeting to meeting while holding, wearing, or carrying the electronic device in which the battery assembly has been installed) and intentional human motion (such as shaking one's cell phone up and down to oscillate a non-cylindrical generator battery within a kinetic energy-based generator). Both activities have equal or similar efficiencies for use/operation of the generator battery replacement.

Briefly, before turning to the figures and particular examples, the charging assembly or its kinetic energy-based generator may be thought of as including a plastic or other non ferrous-material bobbin (or a barrel/tube, providing a magnetic chamber defining a sliding travel path for a permanent magnet, with an added or integral bobbin or spool for receiving a copper wiring or windings forming a generator coil). The bobbin may be a rectilinear shape, a square, a rectangle, a hexagon, or the like—or, basically, any shape with a non-circular cross sectional shape. The bobbin has a bottom portion or extension with short walls protruding out (a bottom portion of a barrel that houses/retains/guides the magnet) and a top portion or extension with the same shaped short walls protruding out (a top portion/end of the barrel that retains/guides the magnet). In the generator, there is copper wire (or other electrically conductive wire) which may be No. 38 AWG or thinner that is wrapped or wound around the bobbin in between the top protruding wall and the bottom protruding wall (e.g., in this embodiment, the coil is formed on a mid section of the bobbin in a specially formed reel/spool or about the bobbin's barrel in which the magnet travels). These walls act as both an alignment as well as a confinement aid for the wrapped copper wire.

The copper wire is wrapped with a number of windings and a height (as measured along axis of chamber holding the generator magnet) each falling within a preset range of values, which are set based upon the shape and size (outer diameter and length, which will determine the available travel distance for the magnet) of the bobbin. For squares and rectangles, the minimum number of turns can be, but is not limited to, about 300, and, as for triangular and hexagonal bobbins, less winding or turns may be sufficient such as 200 to 300 windings or turns of the wire over a preset length or height.

In the generator, there is an open tube portion or chamber in the bobbin (or in the barrel to which the bobbin is attached or in which the bobbin is integrally formed). The chamber typically has the same profile or cross sectional shape as the bobbin sidewalls/exterior surfaces of the reel/bobbin where the copper wire is located/wound, but the chamber is simply an empty void defining a travel path. Inside the chamber/tube portion of the bobbin is a permanent magnet such as a rare earth, neodymium, or other magnet that is bipolarly magnetized at the top and bottom. Its profile or cross sectional shape is the same as the bobbin's chamber/tube portion yet its outer dimensions are just a fraction smaller so as to fit inside the bobbin and glide freely (typically down to a 0.005 inch clearance or some relatively tight clearance).

During operation, the permanent or generator magnet travels within the chamber next to or within the generator coil/windings portion and then out of the coil/windings portion into spaces/voids of the chamber in the top and bottom portions of the bobbin or barrel such that the magnetic field changes, and based on Faraday's laws regarding induction, to cause electrical current to flow in the wires of the coil/windings portion and charge an electrically connected rechargeable battery.

To facilitate oscillation without as much human manipulation/input, the generator may include on the top and bottom of the bobbin smaller permanent magnets (e.g., neodymium magnets that can be about 2 mm in outer dimension (or more or less depending on the form-factor of the device)). These "spring magnets/magnetic springs" are oriented with opposing poles facing the same poles as the large neodymium or other permanent magnet in the center of the bobbin's chamber/tube (e.g., like poles of the generator magnet and the spring magnets face toward each other within the bobbin structure). The interaction of the magnetic fields of these magnets acts as a natural solid state "spring," which keeps the generator magnet buoyant or relatively neutral within the bobbin. Any movement large or small of the bobbin, such as a user walking while wearing an electronic device in which the charging assembly is installed, will make the generator magnet freely slide within the chamber of the barrel/bobbin so that it oscillates into and out of the copper coil windings in a repeated manner to generate current for charging a battery.

The shapes of the bobbin (e.g., the chamber and sidewalls receiving the conductor wire) and the magnet are key design features of the kinetic energy-based generator (recharger). These shapes are chosen to provide electrical and magnet efficiency of the device and, significantly, at a small form factor useful for providing a replacement battery rather than requiring a standalone or separate charger that has to be toted about by the user. Generally, the chamber and bobbin external sidewalls are non-circular in cross sectional shape (in contrast to prior devices using a cylindrical tube and bobbin and a cylindrical magnet).

For example, the generator magnet may have a rectangular cross section and overall shape. The inventors have proven with prototypes that having a rectangular magnet inside a rectangular bobbin allows for more windings to be provided in a smaller form factor than if one were to use cylindrical magnets and bobbins. The inventors recognized that charging assemblies are able to yield/harvest more energy from a Faraday-based device the more magnet (e.g., magnetic surface area) they have and the more copper (e.g., conductor material) they have at a closer proximity to one another. The shape and arrangement of the various components of the charging assembly, such as copper windings, generator magnet, and bobbin (reel/spool sidewall shapes, chamber cross sectional shape, and the like) make for more voltage yield in a smaller form factor, which allows it to be used within an electronic device rather than as a separate/outside device that has to be connected and oscillated to affect charging.

In a complete battery assembly, a lithium-ion rechargeable battery pack is placed on top or to the sides of the bobbin. The battery pack may have the same voltage output as the battery in which the device is replacing, i.e., if the battery assembly (or battery replacement apparatus) is replacing a cell phone battery then the Li-ion battery pack adjacent to the charging assembly is 3.7 Volts because most cell phone batteries are 3.7

Volts. In some embodiment, the current-per-hour output of the device may be lower than the battery it is replacing due to the smaller form factor of the Li-Ion pack (e.g., the charging assembly takes some of the space previously used for the battery of the electronic device). A typical cell phone battery will be 3.7 Volts at 1440 mAh, whereas the above-mentioned prototype device may be 220 mAh at 3.7 Volts.

Significantly, though, this current output typically does not affect the user because, when the electronic device and its "integral" or "embedded" battery charging assembly is in motion, the device is perpetually recharging its milliamp per hour output yield from the Li-ion battery with charging electrons from the kinetic energy-based charging assembly. Effectively, the user will never bottom out the current of the Li-ion battery (or rechargeable battery of the battery replacement apparatus) because the rechargeable battery is being refilled/recharged on an ongoing basis.

FIG. 1 illustrates a functional block or electrical circuit/block diagram of an electronic device 100, such as a mobile phone, GPS device, portable video game, digital camera, or the like. The electronic device 100 includes a "replacement battery device" in the form of a charging assembly 110 combined with a rechargeable storage battery 120. For example, the charging assembly 110 and storage battery 120 may be designed to have a form factor that matches an existing electronic device battery such that this conventional battery may simply be removed and replaced with the charging assembly 110 and storage battery 120 (with or without modification of the other components of the device 100 such as its housing to receive and retain the battery replacement apparatus).

The rechargeable storage battery 120 (e.g., a Li-ion battery or the like) is electrically connected to one or more loads 130 of the electronic device 100 such that the battery 120 supplies electricity used by the electronic device 100. The rechargeable storage battery 120 is electrically connected at its positive and negative connections 122, 123 to the charging assembly 110 such that during operation of the charging assembly 110 (e.g., when the electronic device 110 is shaken or oscillated as may occur during sedate movements such as walking and more active movements such as running or rigorous, intentional shaking for a quicker charge) current 118 is provided to the battery 120 for storage or for use via leads 134 by device load 130. The storage battery 120 acts as a ballast to keep energy that has been generated within the generator 112 for continuous and/or extended ongoing use by the load 130. The storage battery 120 may be a capacitor, a Li-ion battery, a nickel cadmium battery, or other electrical storage device.

Typically, the current 118 is DC current, and the charging assembly 110 includes components to convert and condition (if necessary) the current it produces to useful DC current 118. For example, at 114, the charging assembly 110 is shown to operate to output raw electricity 114 from the kinetic energy-based generator (e.g., a copper windings/bobbing generator) 112 in the form of alternating or AC current. An AC to DC converter 116 is provided in the charging assembly 110 in this exemplary, but not limiting implementation, in the form of a bridge rectifier (or diode bridge), which very efficiently changes the raw AC current 114 from the generator 112 to usable DC or direct current 118 that can be supplied at connections 122, 123 to the storage battery 120. A Zener diode or similar device (such as a flyback diode) 119 may be provided, such as on the positive lead/output line of charging assembly 110 as shown, so as to create an electrical one-way valve such that electricity only flows in one direction and not back into the generator 112 from the battery 120.

A key feature of the charging assembly 110 is the kinetic energy-based generator 112 that outputs current 114 when the device 100 and included charging assembly 110 are oscillated or undergo relatively small amounts of motion. The generator 112 may, in simple terms, be considered a Faraday-based generator that includes a bobbin with exterior sidewalls and an internal chamber/bore with a non-circular profile or cross sectional shape. Further, generator 112 includes a permanent magnet of a shape similar to but smaller than the internal chamber such that, when copper windings or a coil is provided on the bobbin's exterior walls and the magnet moves in and out of the region of the chamber adjacent or within the coil, electrical current is generated as shown at 114.

In some embodiments, the copper windings or coils formed of copper or other electrically conductive wire are formed from No. 38 AWG or thinner wire. The wire may be lacquered and wrapped or wound around a bobbin or spool (which is provided integrally or as an attached part to the generator barrel providing the chamber for guiding the permanent magnet that may be a rare earth magnet, a neodymium, or other permanent magnet) formed of non-ferrous material (such as a plastic bobbin/barrel combination part). In some cases, it has been found useful to use a minimum number of turns/wraps/windings of about 300.

Figure 2A:
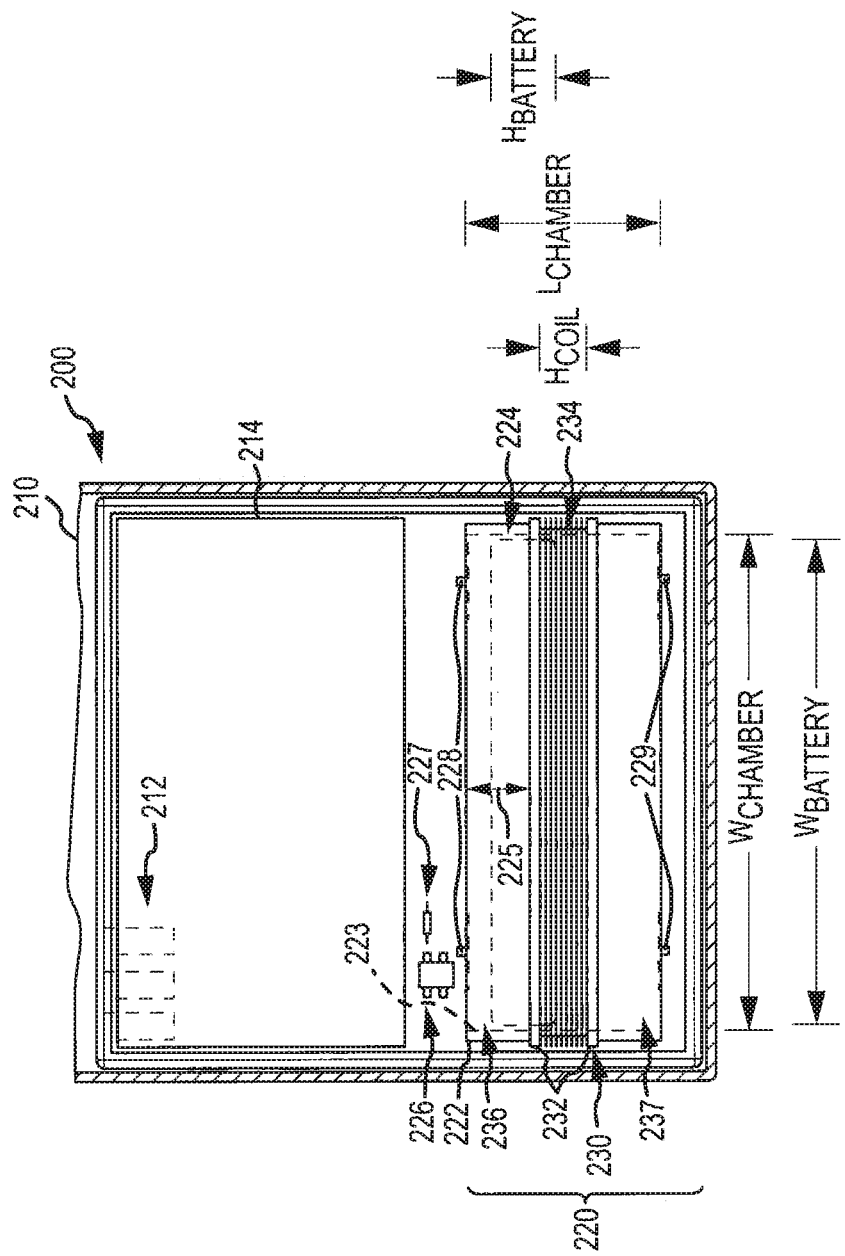
FIGS. 2A and 2B illustrate front and side views, respectively, of an electronic device such as a mobile phone with a back cover removed to illustrate an exemplary battery assembly with a rechargeable battery and charging assembly of an embodiment of the invention.
Figure 2B:
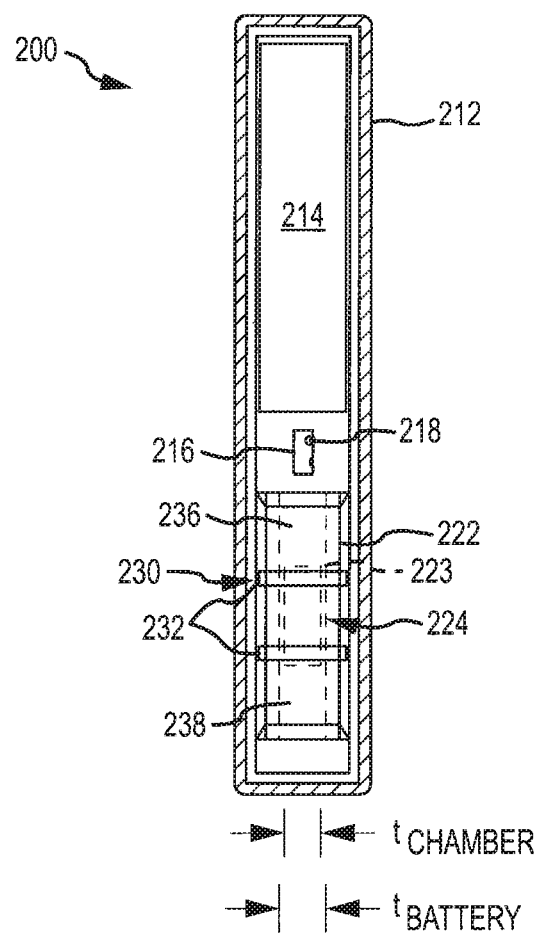

FIG. 2A illustrates an electronic device 200 (such as a mobile phone) with its back cover removed exposing its internal components (e.g., to show its battery compartment) while FIG. 2B illustrates the electronic device as a side view with the housing sidewall(s) shown to be cut partially away to expose the internal components of the device 200. As shown, the electronic device 200 includes the components taught herein that provide a battery replacement apparatus. Specifically, the device 200 has a housing/shell 210 with copper battery contacts 212 providing a connection to the device's battery load or the device's components that use current from the device's battery.

The replacement battery apparatus or battery assembly is provided by a storage battery 214 (e.g., a Li-ion battery or the like) and a kinetic energy-based charging assembly 220 (connections/wiring between components of the charging assembly 220 and the battery 214 are not shown for simplicity of illustration but will be understood by anyone in the electrical arts). The storage battery 214 is about one half the size of a conventional battery for the device 212 to allow room for the charging assembly 220. In other words, the replacement apparatus has about the same size and form factor as the battery it is replacing while the charging assembly is less than about one half (or fifty percent the size), while still providing adequate current/power to run the loads of the device linked to contacts 212. The battery 214 acts to keep the power constant for loads of device 200 and as a power ballast.

The charging assembly 220 includes an AC-to-DC converter 226, which acts to convert AC output by the coils/generator windings 234 into DC that is then supplied to battery 214. As noted above, the converter 226 may take many forms to practice the device 200 such as a bridge rectifier, a diode bridge, or the like. A Zener diode, flyback diode, or other device 227 may be provided to act as a one-way valve for electricity created by the generator such that the current flows into the battery 214 from the generator's windings 234 and not back into the windings 234.

The charging assembly 220 includes a barrel or sleeve 222 that includes inner sidewalls or interior surfaces 223 that define a chamber or tube portion in which a generator magnet 224 is positioned and allowed to travel on an electricity-generating travel path. The barrel or sleeve 222 is shown to be rectangular in shape, and the inner sidewalls 223 define a chamber with a length, $L_{Chamber}$, that is about equal to the height of the barrel/sleeve 222 and with a thickness, $t_{Chamber}$, that is about equal to the depth of the barrel/sleeve 222 less the thicknesses of the walls of the barrel/sleeve 222.

For example, the length, $L_{Chamber}$, may range from about 0.5 to about 3 inches (or more) while the thickness, $t_{Chamber}$, may range from about 0.15 to 0.5 inches (or more) for a typical electronic device 200. The thicknesses of the sidewalls of the barrel 222 (and bobbin section 230) may be very thin such as less than about 1/32 of an inch, with such thin walls being desirable to provide higher efficiencies of energy transfer between the copper windings 234 and the magnet 224. The barrel or magnet housing 222 (as well as at bobbin section 230) is formed of a non-ferrous material such as a plastic or other lightweight material.

The main generator magnet 224 is a permanent magnet, such as a neodymium magnet, with opposite poles arranged at top and bottom ends (ends facing the battery 214 and away from the battery 214, for example). The magnet 224 is configured in the shape of a rectangle, but other non-cylindrical shapes may be used in other embodiments depending on the intended use that may limit or set acceptable size (outer dimensions) and form factors (e.g., a flat rectangular shape is useful when replacing a similarly shaped conventional cell phone battery whereas a replacement apparatus for a conventional cylindrical battery may be an elongate magnet with three or more sides (e.g., a polygonal cross sectional shape)).

The rectangular magnet 224 has a height, $H_{Magnet}$, that is significantly less than the length, $L_{Chamber}$, of the chamber in magnet housing/barrel 222 such that it can travel or move about in the chamber to generate electricity. For example, the height, $H_{Magnet}$, is typically less than about half the length, $L_{Chamber}$, and is often less than about one third (as shown). The height, $H_{Magnet}$, of the magnet 224 is often chosen to be about equal to or less than (such 80 to 50 percent or less) of a height, $H_{Coil}$, of the copper windings/coil 234 to allow the magnet 224 to move a greater distance in housing/barrel 222 (in and out of coil 234) to generate more electricity.

The magnet 224 has a width or thickness, $t_{Magnet}$, that nearly matches the width or thickness, $t_{Chamber}$, of the chamber defined by inner surface/sidewalls 223. Typically, it is desirable to provide a very small clearance between the sides of the magnet 224 and the inner surfaces 223 of the barrel/magnet housing 222 such that the magnet 224 can freely slide or move 225 in the chamber but such that the surfaces of the magnet 224 are positioned as close as possible/practical to the coil 234. For example, the thickness, $t_{Chamber}$, and width, $w_{Chamber}$, of the chamber formed by inner sidewalls 223 may each be about 0.005 to 0.010 inches (or more) greater than the thickness, $t_{Magnet}$, and width, $w_{Magnet}$, of the magnet 224.

In the charging assembly 220, the coil/windings 234 have a height, $H_{Coil}$, that is chosen such that the magnet 234 is able to move out of the coil at both ends of its travel path in the barrel/magnet housing 222. This causes electricity to be generated via induction twice during each travel cycle, e.g., each time the magnet 234 makes a full loop such as starting at the top of the chamber, dropping to the bottom of the chamber, and then returning back to the top of the chamber which causes it to pass through the coil/windings 234 twice. Specifically, the chamber in housing/barrel 222 has a length, $L_{chamber}$, that is three times as large as the height, $H_{Coil}$, of the coil/windings 234 and the bobbin 230 is placed at the midpoint of the barrel/housing 222 and the defined chamber holding the magnet 224. Further, the magnet 224 has a height, $H_{Magnet}$, that is equal to or less than the coil height, $H_{Coil}$.

As a result of this arrangement, the chamber in barrel 222 provided by sidewalls/interior surfaces 223 has first and second or top and bottom voids or spaces 236, 237. These spaces or voids 236, 237 define spaces or areas of the charging assembly 220 in which the magnet 224 may travel in the chamber and move out of the interior of the coil/windings 234. These spaces/voids 236, 237 typically are at least as large as the magnet 224 such that the magnet 224 can be fully received within the spaces 236, 237 (move out of the coil 234). It is this transition that allows the charging assembly 220 to cause current to flow in the coil 234 into the battery 214.

In the device 200, the charging assembly 220 further includes one or more (two shown) upper (or first) spring magnets (or magnetic springs) 228 and one or more (two shown) lower (or second) spring magnets (or magnetic springs) 229. These may be very small permanent magnets (such as neodymium magnets or the like) that are spaced apart at opposite ends of along the width of the end of the chamber in the barrel/housing 222. The spring magnets 228, 229 are arranged with magnetic poles opposite to the facing/adjacent poles of the generator magnet 224 facing inward to the chamber of barrel 222. This creates a small repelling effect or force that makes the generator battery 224 relatively neutrally buoyant in the barrel/housing 222. Such a magnetic spring effect at each end is desirable as it allows very little motion of the device 200 (or charging assembly 220) to cause the generator magnet 224 to pass in and out of the copper windings 234 (into a position in the chamber of barrel 222 that is within or adjacent to the coil 234 and then out into the void/spaces 236, 237 of the chamber).

The charging assembly 220 further includes a bobbin or spool 230 that is attached to or formed as an integral feature of the barrel/magnet housing 222. The bobbin 230 has end walls 232 (in this embodiment) extending laterally outward from the barrel 222 a short distance to provide ends or stops defining a height, $H_{Coil}$, of the coil or windings 234. Conductive wire (such as copper wire that is no larger than about No. 38 AWG) is then wound, turned, or wrapped about the bobbin 230 between end walls 232 to provide a generator coil or windings 234 used to generate electricity due to interaction with the magnetic fields of magnet 224. The coil/windings 234 may include wire wrapped at least about 300 times around the bobbin 230, and this wire of coil 234 may be lacquered for insulation. Ends of the wire of coil 234 would then be electrically connected to the battery 214 via AC-to-DC converter 226 and diode 227. As with the barrel/magnet housing 222, the bobbin 230 is formed of a non-ferrous material such as a plastic, a glass, or a ceramic, and its thickness is kept to a minimum such as by forming it integrally with magnet housing/barrel 222 so as to position the wires of coil 234 as close to the traveling/moving 225 magnet 224 as possible/practical.

Figure 3:
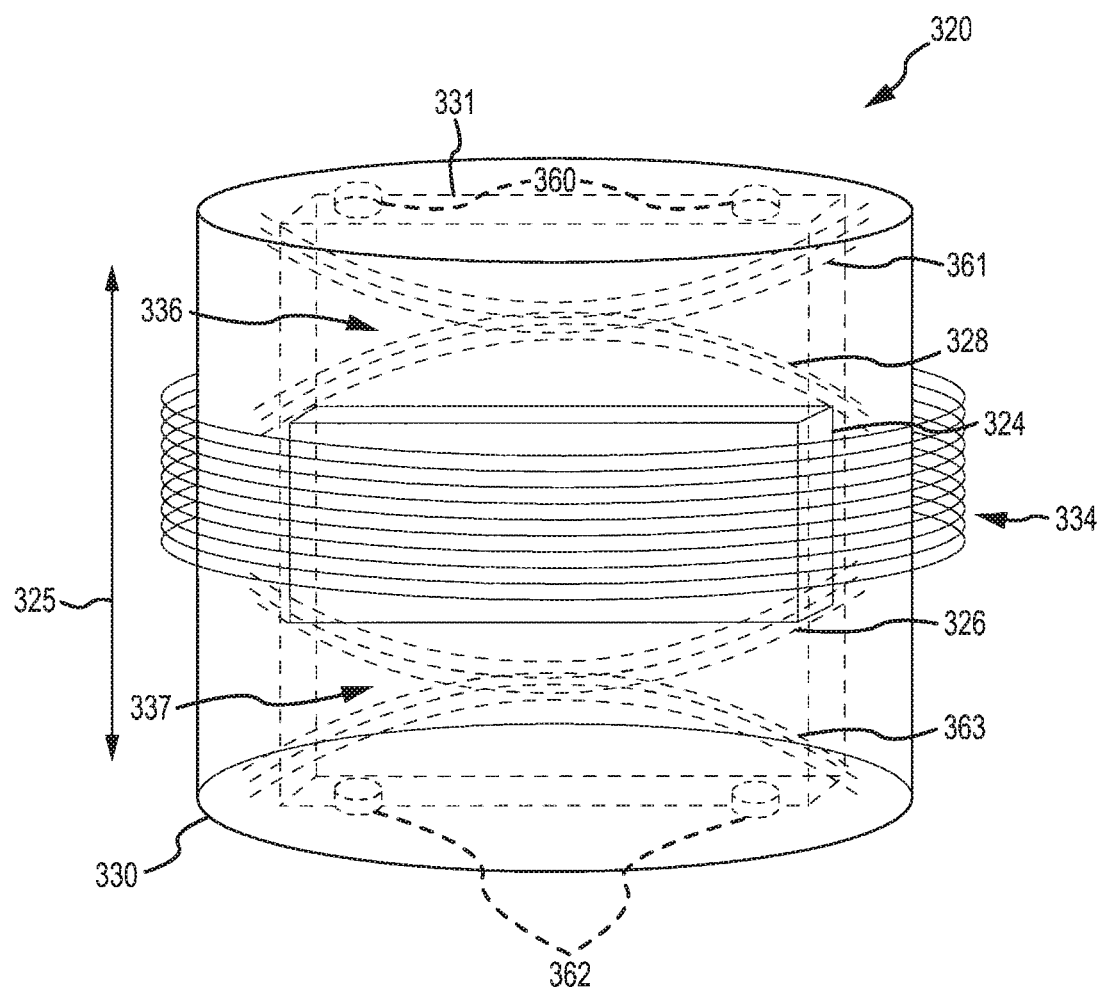
FIG. 3 is a perspective view of a charging assembly that may be used in embodiments described herein and illustrates schematically operation of the charging assembly with its magnetic springs for controlling and/or improving sliding or oscillating movement of the generator magnet within a generator chamber.

FIG. 3 illustrates a perspective view of a charging assembly 320 that shows schematically operation of an exemplary charging assembly 320 that includes two end voids/spaces in the travel chamber and also that includes magnetic springs at each end of the chamber. The charging assembly 320 includes a bobbin or magnet housing 330 in which a bobbin or spool area is provided integrally on the outer surfaces/sides of the housing's sidewalls and the bobbin 330 includes inner surface/sidewalls 331 defining a chamber in which a generator magnet 324 is positioned and allowed to slide/travel 325.

The outer surfaces or sidewalls of the housing/bobbin 330 are circular in cross sectional shape while the chamber defined by inner sidewalls 331 is rectangular. This may be useful where the form factor of the battery being replaced with the charging assembly 320 is a cylinder (e.g., an AA, AAA, or similar battery). As a result, a coil/copper windings 334 that are wrapped about a bobbin/spool portion (e.g., the midpoint/midsection) of the barrel/housing 330 form an inner surface or tunnel (coil passageway) that is cylindrical or has a circular cross section. In contrast, though, the chamber formed by sidewalls/surfaces 331 is rectangular (as was the case for charging assembly 220), and the generator magnet 324 is also rectangular. The combination of a circular coil 334 and a rectangular (or polygonal) magnet 324 provides a large improvement in power/current generation efficiencies when compared with use of a cylindrical magnet with a circular coil.

The height of the coil 334 is chosen to be smaller (such as one third or less) than the overall height of the bobbin 330 (or at least of the chamber defined by sidewalls 331) such that a top and a bottom void/space 336, 337 are provided in the chamber of the bobbin 330 for the magnet 324 to travel during oscillation of the bobbin 330. The generator 320 also includes upper and lower spring magnets 360, 362 that may be cylindrical/button permanent magnets such as neodymium magnets that are much smaller than the main generator magnet 324 and are provided, as shown, with their poles of like polarity facing inward toward the generator magnet 324 (e.g., N poles of the spring magnets facing or adjacent the N pole of the generator magnet 324). This causes the magnetic fields 361, 363 of the spring magnets 360, 362 to oppose and interact with the magnetic fields 328, 326, respectively, of the main generator magnet 324 (or at least when the magnet 324 travels 325 to a certain distance or separation spacing from such magnets 360, 362), which causes the main generator magnet 325 to be relatively neutrally buoyant in the chamber of bobbin such that very little motion causes it to move between voids 336, 337 through the space within or portion of the chamber defined by sidewalls 331 within the coil/windings 334.

The opposing magnet fields 328 and 361, 326 and 363 may provide a relatively small repelling effect, but this allows the main generator magnet 324 to more readily pass in and out of the copper windings 334 regardless of gravitational pull. As a result, motions of a human/user holding, carrying, or wearing the charging assembly 320 such as walking, running, or simply going about daily activities is typically enough to make the magnet 324 shift 325 up and down in an oscillatory motion (up into the void 336 where it is repelled by field 361 of magnets 360 and down into the void 337 where it is repelled by field 363 of magnets 362). The motion 326 of the main generator magnet 324 through and out of coil 334 is what generates electricity in coil 334. Again, the windings/wires of coil 334 may be copper wires that are wrapped around the bobbin 330 at its midpoint, and the copper wire may be smaller than about No. 38 AWG wire and have 300 or more turns/wrappings about bobbin (a complete wrap of wire about the circumference of the bobbin 330 is a turn/wrapping or a winding).

Figure 4:
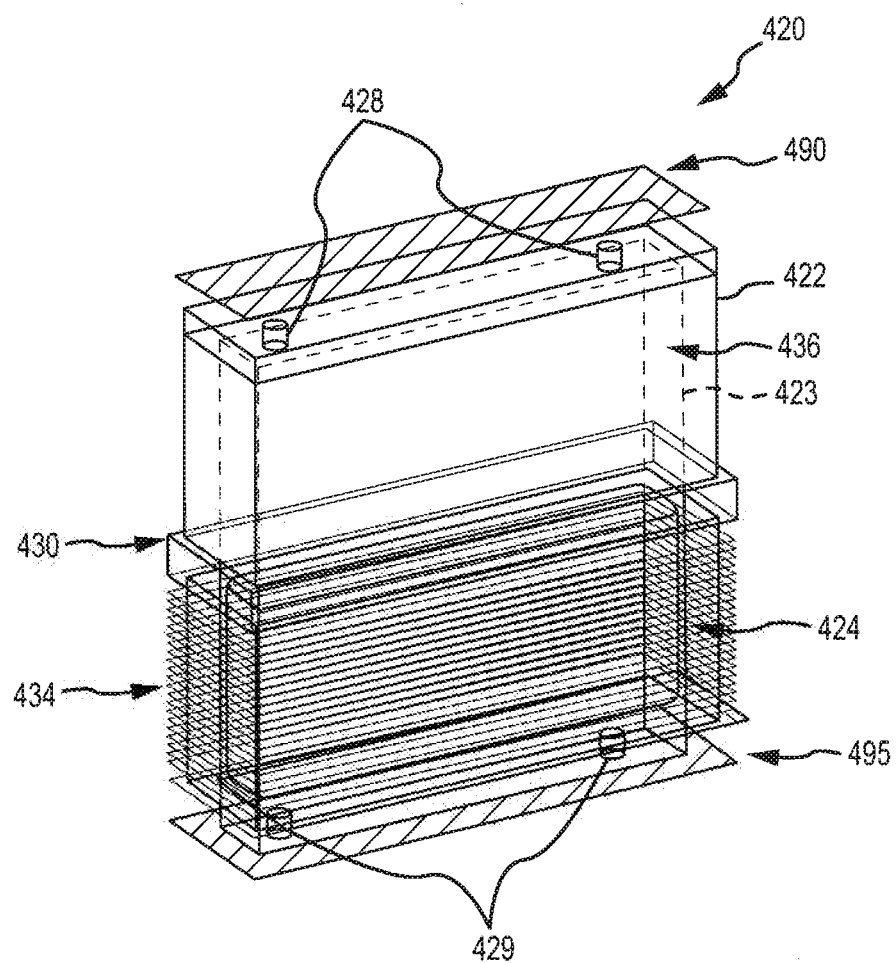
FIG. 4 is a perspective view of another embodiment of a charging assembly for use in a battery replacement apparatus or device showing use of a single void or travel space for the generator magnet and also showing use of piezoelectric elements to provide added or improved power harvesting.

FIG. 4 illustrates a perspective view of another embodiment of a battery charging assembly 420 that may be utilized in an electronic device such as in the device 200 with battery 214. As shown, the charging assembly 420 includes a barrel or magnet housing 422 that is generally rectangular in shape (e.g., a flat rectangular as typical of many electronic device batteries and battery housings in which the assembly 420 would be positioned in use). The barrel or housing 422 includes inner sidewalls 423 that define an interior chamber that extends the height or length of the barrel or housing 422. The chamber is rectangular in shape and defines an electricity-generating travel path for a received generator magnet 424, which too is rectangular in shape that matches that of the chamber with a small clearance provided to allow the battery 424 to freely slide in the chamber without binding. Specifically, the magnet 424 may be a permanent magnet that has a width much larger than its height and has a first pole facing upward (or a first direction) within the chamber and second, opposite pole facing downward (or a second opposite direction) within the chamber.

The charging assembly 420 further includes pairs of spring magnets 428, 429 at each end of the chamber 423 of the barrel/housing 422. Within each pair of the magnets 428, 429, the magnets (permanent magnets) are placed at opposite ends/sides of the chamber with their magnetic poles being opposite that of the closest pole of the larger, generator magnet 424. This creates a very slight repelling effect that makes the main battery 424 neutrally buoyant in the barrel/housing 422, which allows very little vertical motion to cause the magnet 424 to pass in and out of the copper windings/coil 434.

In this regard, the assembly 420 includes a bobbin portion 430 on an exterior surface of the barrel/housing 422. In this embodiment, the bobbin portion 430 is provided at one end of the housing 422 and its chamber 423. A coil/windings of copper wire (e.g., No. 38 AWG wire) is wrapped (e.g., 300 or more times) about the bobbin portion 430 toward one end of the barrel/housing 422, and the height of the coil 434 is set by an end wall/stop on bobbin 430 that provides a single (upper) void/space 436 into which the magnet 424 can travel when it moves out of or away from coil 434.

For example, the chamber 423 may have a particular length and the coil/windings 434 may have a height that is less than this chamber length such that the magnet 424 can fully escape or travel out of the coil 434 to generate electricity in the coil 434. The coil height may be about half or less of the chamber length and the magnet 424 may have a height that is also less than half of the chamber length (e.g., 40 to 50 percent of the chamber length in this example where the coil height is about 50 percent of the chamber length). In the embodiment of charging assembly 420, the magnet 424 only generates electricity based on induction once per oscillation cycle (e.g., only passes both in and out of the coil 424 once as it travels from void 436 into the coil 434 and then back into the void 436 and out of the coil 434).

In contrast to other embodiments, the charging assembly 420 further includes upper and lower (or first and second) elements 490, 495 at the opposite ends of the chamber 423 of barrel 422. These elements 490, 495 may be piezoelectric elements that may be formed from sheets of piezoelectric material (e.g., a ceramic-based, aluminum-based, or other material). When this material is struck by the shifting magnet 424, the elements 490, 495 generate a small quantity of electricity. Hence, the elements 490, 495 may be positioned within the chambers 423 of barrel 422 between the spring magnets 428, 429 and the chamber 422 to allow such contact before the magnets 428, 429 repel the larger magnet 424. The electricity from the piezoelectric end sheet/elements 490, 495 is fed into a bridge rectifier (or other AC to DC converter) as is the electricity from the coil 434 such that both "generators" can charge the storage battery (such as battery 214 of FIG. 2) for improved charging capacity or efficiency. The battery would then have two generators feeding electricity to it, and since many kinds of piezoelectric materials are nonferrous by nature, the generator magnet 424 strikes it without sticking to it.

In some cases, it may be desirable to provide a replacement apparatus that may be used to replace a conventional cylindrical battery such as an AA battery, as these are used in many personal/portable electronic devices. FIG. 5 illustrates a perspective view of a battery assembly 505 of the present invention that may be used as a replacement for this type of battery, and FIG. 6 illustrates an exploded view of a portion of the charging assembly 520 of the battery assembly 505 showing a main generator battery 524 prior to insertion into a chamber of a barrel/magnet housing 522.

The battery assembly 505 includes a battery housing or enclosure 510 with positive and negative contacts 511, 512 typical of cylindrical batteries (such as an AA battery or the like). The enclosure sidewall 510 is shown partially cut away or removed so as to expose the internal components including a rechargeable storage battery 514 and a charging assembly 520. In the battery assembly 505, the storage battery 514 may by a cylindrical Li-ion battery or other rechargeable cylindrical battery. Typically, the battery 514 is chosen to fill all the space in housing 510 not taken up by the charging assembly 520 such as up to about 50 percent of the volume or as shown between about 30 and 40 percent (i.e., the battery 514 may have an outer diameter about that of the inner diameter of the housing 510 and a length/height of about 30 to 50 percent of the height of the housing 510. The battery 514 is charged by current flowing from the charging assembly 520, with connecting wires not shown for simplicity of illustration.

To this end, the charging assembly 520 includes a bridge rectifier, a diode bride, or AC-to-DC converter 526 that takes the AC current from the coil/windings 534 and converts it to DC current useful to the battery 514. The charging assembly 520 also includes a Zener diode, a flyback diode, or similar device that functions to act as a one-way valve for the electricity created by the generator portion of charging assembly 520 so the current flows into the battery 514 but not back into the generator again.

The charging assembly 520 includes a barrel or magnet housing 522 that extends the length of the charging assembly 520 (e.g., about 50 to 70 percent of the length of the battery housing 510), and the barrel 522 may have a circular-shaped outer wall but an inner wall/surfaces 523 may define a chamber or bore with a square cross section (e.g., equal or nearly equal sidewalls). The assembly 520 further includes a bobbin or spool portion 530 at an end of the barrel 522 and its chamber 522, which in this case is opposite the battery 514 but this arrangement may be reversed to practice the invention. End stops 532 define the top and bottom of the bobbin 530 and, therefore, the height of the coil/windings 534, which include copper wire (No. 38 or smaller gauge copper wire) that is wound or wrapped (300 or more times/turns) about the outer cylindrical shape of the barrel/magnet housing 522 in between the end stops 532. In this manner, the bobbin 530 (or barrel 522), which is made of a nonferrous material such as plastic, has a square void or chamber for a permanent magnet 524 to travel the length, $L_{Chamber}$, of the chamber 523 and in and out of the coil/copper windings 534. The nonferrous material between the coil/windings 534 and the void/chamber 523 (and a contained magnet 524) are typically minimized, such as less that about $\frac{1}{32}$-inch to improve the efficiency of the charging assembly 520 (e.g., reduce spacing between magnet 524 and coil 534, increase number of copper windings that can be provided in a particular space, and so on).

A generator magnet 524 is inserted into the elongate chamber 523, and, in this embodiment, the magnet 524 is also elongate with a height (or length), $H_{Magnet}$, that is much greater than its other dimensions. Specifically, the magnet 524 may have a height, $H_{Magnet}$, that is about one half or some amount less than the length, $L_{Chamber}$, of the chamber defined within the barrel/magnet housing 522 by inner surfaces/sidewalls 523. In other words, the magnet 524 is about the height of the coil 534 or bobbin portion 530, and it may be square in cross sectional shape with an overall rectangular outer configuration. The chamber 523 of the barrel/magnet housing 522 has a length, $L_{Chamber}$, that is large enough that the magnet 524 is able to travel fully out of the coil 534 or as necessary out of coil 534 to cause electricity to inductively flow in coil 534 to the AC-to-DC converter 526. The void 536 created or left in chamber 523 may be the same length/height as the height, $H_{Magnet}$, of the generator magnet 524 to allow the magnet 524 to pass into the void 536 when it leaves the copper coil area 534. In the charging assembly 520, only one void 536 is provided adjacent one side of the coil 534, but, in other embodiments, a void/space in the chamber may be provided at both ends as shown in FIG. 2. In one embodiment, the rectangular magnet 524 is chosen as it provides more electrical efficiency for the generator 520 than a cylindrical shaped magnet, and it takes the form of a neodymium magnet with a gauss rating of N42 or higher.

As with some other embodiments, one, two, or more spring magnets 528 may be provided at opposite ends of the barrel 522 in or near the chamber/bore defined by inner sidewalls 523. These are arranged with their magnetic poles opposite to the nearer one of the poles of the generator magnet 524. This creates a repelling or opposing effect as the generator magnet's magnetic fields interact with those of the spring magnets 528, which enhances the free and more efficient movement of the generator magnet 524 with smaller or less rigorous movements of the battery assembly 505.

At this point in the description, it may be useful to discuss more fully a variety of non-cylindrical shaped magnets (and corresponding chambers/bobbins) that may be used to provide enhanced kinetic energy capture or harvesting in a charging assembly of the present invention. Many cross sectional shapes may be chosen for the generator magnets with each generally having a polygonal cross sectional shape (e.g., three or more sides) and a height that is equal to or less than a coil/copper windings height (e.g., to maximize the interaction of the conductive element and the magnetic fields but not require a longer than necessary chamber or bore to move the magnet out of the coil).

FIGS. 7A and 7B illustrate an end view and a side exploded view, respectively, of a charging assembly 720 that includes a barrel or magnet housing 722 with a sidewall 723 defining outer surfaces and inner surfaces with a hexagonal shape. Hence, the chamber or bore has a hexagonal shape as does the bobbin portion (no end stops shown in this example), and an elongate permanent magnet with a hexagonal cross sectional shape (e.g., six outer walls or sides 725) is used as the generator magnet 724. A clearance 729 is provided between the outer walls/sides 725 of the magnet 724 and the chamber 723 such as less than about 0.005 to 0.010 inches. The magnet 724 has a height, $H_{Magnet}$, that is less than the height, $H_{Coil}$, of the coil 734 wrapped about the barrel 722, e.g., 70 to about 100 percent of the coil height or the like. In this embodiment, two voids (one at each end of the coil 734) are provided in the chamber 723 such that the chamber length, $L_{Chamber}$, is about three times the magnet height, $H_{Magnet}$.

As shown, the charging assembly 720 utilizes a hexagonal copper winding 734 (at least at its core where copper wires abut the outer surfaces for the barrel/magnet housing 722 in the bobbin portion/section of the barrel 722). As a result, there is much more surface area for the copper of coil 734 to be close to the magnet 724, and this makes for a much more energy efficient Faraday-based generator 720 when compared with a cylindrical coil/magnet of the prior art. The hexagonal shape of the bobbin's outer surfaces (or outer surfaces of barrel in the bobbin section/portion) also affords more copper windings and a larger magnet 724 to fit into a smaller space than the cylindrical shapes of the prior art Faraday-based charger. The hexagonal generator magnet 724 (e.g., a hexagonal neodymium magnet) has more edges than a cylindrical magnet, and each of these edges/corners creates more surface area for the magnet 724 to be in closer contact with the copper windings of coil 734, which yields more electricity in a smaller form factor.

FIGS. 8A and 8B illustrate an end sectional view and a side exploded view, respectively, of another charging assembly 820 that may be used in a battery assembly of the present invention. The charging assembly 820 includes a barrel or magnet housing 822 with a sidewall 823 that defines a triangular chamber and also a triangular profile for a bobbin section/portion of the coupling assembly 820. An elongate permanent magnet with a triangular cross section is used for the generator magnet 824 (e.g., a permanent magnet with a pole at each end and with three sides (not counting the two ends). The coil 834 is wrapped or wound about the bobbin portion of the barrel 822 to form a hollow, elongated coil with a triangular cross sectional shape, and the coil 834 may be provided at the middle portion of the barrel 822 to provide for two voids/spaces for the generator battery 824 to slide out of the coil 824 when oscillating up/down or back and forth in the chamber 823. A gap or space 829 is provided between the sides 825 of the magnet 824 and the inner surfaces 823 of the barrel 822. Again, the generator magnet 824 may have a height that is about equal to (or somewhat less than) the coil height/length along the barrel 822, and the chamber 823 may extend the entire length of the barrel 822 to be about three times the length of the coil 834 (or the magnet 824).

In the assembly 820, a triangular copper winding 834 is provided. There is much more surface area for the copper of the winding/coil 834 to be close to the magnet 824 for a much more energy efficient Faraday-based generator 820 than achieved with a cylindrical-type generator of the prior art. Again, the use of the triangular shape also affords more copper windings in coil 834 as a larger magnet 824 fits into a smaller space than was the case with the cylindrical-shaped magnets of the prior art devices. The magnet 824 may take the form of an elongate neodymium magnet with a triangular cross section, and this has more edges than a cylindrical magnet as used in prior devices. Each edge of the triangular magnet 824 provides more surface area for the magnet 824 to be in closer contact with the copper windings of coil 834 thereby yielding more electricity in a smaller form factor.

FIGS. 9A and 9B illustrate an end view and an exploded side view, respectively, of another embodiment of a charging assembly 920 of the present invention. The assembly 920 includes an elongated barrel 922 defining with its sidewalls 923 a bobbin section for receiving coil 934 that is rectangular in profile/cross and also a chamber that runs the length of the barrel/housing 922 that is rectangular in cross section. A small gap 929, such as about 0.005 to 0.010 inches or the like, is provided between the magnet's sides 925 (four to provide a rectangular cross sectional shape) to allow the magnet 924 to freely slide within the chamber of barrel 922. The magnet 924 typically will have a height/length that is about equal to or slightly less than the height of the coil 934, and the chamber 923 of barrel 922 is shown to be about at least three times the height of magnet 924 such that the chamber 923 provides voids/spaces for the magnet 924 to travel outside of the coil 934 of the charging assembly 920.

As shown, the charging assembly 920 provides a rectangular winding 934 (of copper wire at No. 38 AWG or the like). As a result, there is much more surface area for the copper of the coil 934 to be close to the magnet 924, making the assembly 920 a much more energy efficient Faraday generator than the typically device utilizing cylindrical windings/coils. The rectangular shape also affords more copper windings in coil 934 as a larger magnet fits into a smaller space than the cylindrical prior art devices. The rectangular magnet (e.g., a neodymium magnet) has more edges/corners than a cylindrical magnet of a conventional Faraday generator. Each edge creates more surface area for the magnet 924 to be in closer contact with the copper windings/coil 934, which yields more electricity in a smaller form factor.

FIGS. 10A and 10B illustrate a sectional end view and an exploded side view, respectively, of another charging assembly 1020 of the present invention. As shown, the assembly 1020 includes an elongate barrel or magnet housing 1022 with a sidewall 1023 defining a square outer profile/section in a bobbin/spool section where a coil 1034 is formed with copper wire or the like and also defining an inner chamber/bore that is square. The chamber is about three times the length of the coil 1034 and received a generator magnet 1024. The generator magnet 1024 is also square with four exterior sides 1025 with dimensions nearly matching the interior walls 1023 of barrel 1022 such that there is only a small clearance/gap 1029 between the sides 1025 and inner surface of sidewall 1023 when the magnet 1024 is placed in the barrel's chamber to slide freely from end to end. The magnet 1024 has a length that typically equal to or slightly less than the coil length and the magnet 1024 typically can fully fit within voids in the chamber 1023 provided at either end of the coil 1034 (such as when the charging assembly 1020 is shaken or oscillated by a user).

In the assembly 1020, a square winding 1034 is provided (e.g., of 300 or more turns/windings of copper wire). There is much more surface area for the copper of the winding 1034 to be close to the magnet 1024, which makes for a much more energy efficient Faraday generator than the typical generator using a cylindrical winding. The square shape also affords more copper windings as a larger magnet is fit into a smaller space than was the case with the use of a cylindrical magnet and bobbin. A square neodymium or other material magnet 1024 has more edges than a cylindrical magnet, and each edge provides a location where more surface area is available for the magnet 1024 to be in closer contact with the copper windings of the coil 1034 such that more electricity is harvested or output by the charging assembly 1020 in a smaller form factor relative to a cylindrical-shaped magnet.

FIG. 11 illustrates in more detail the charging assembly 720 of FIGS. 7A and 7B, and it is intended to better show the improved proximity between the magnet and copper winding achieved with a magnet with a polygon cross section. As shown, the magnet 724 has a number of corners or edges 1180 that improve the efficiency of the assembly 720. In part, this is because the thickness, $t_1$, of the windings of coil 734 at edge 1181 of the bobbin/barrel 722, for example, is less than the thickness, $t_2$, at a side 725 of the magnet 724 (or polygonal shape).

In other words, the corners 1180, 1181 in the magnets 724 and barrel/housing 722 where the coil 734 is wrapped/wound create more surface area and closer proximity for the magnetic field to affect the copper windings of the coil 734, which causes the charging assembly 720 to be a more efficient generator. The many corners of any polygon make for more surface area for the magnet and copper winding to have a closer proximity. FIGS. 7A to 11 show that any polygonal shape for the barrel/bobbin and coil (or copper windings) will yield an almost cylindrical outer shape when the copper windings are wrapped a desired number of times (e.g., 300 or more times). This creates more room for copper windings as well as more room for a larger magnet than the prior art, which relied upon all shapes to be cylindrical. The polygonal shape also provides more electrical generation in a smaller form factor (e.g., more efficient as obtain more output per unit of volume for the charging assemblies taught herein).

Figure 12:
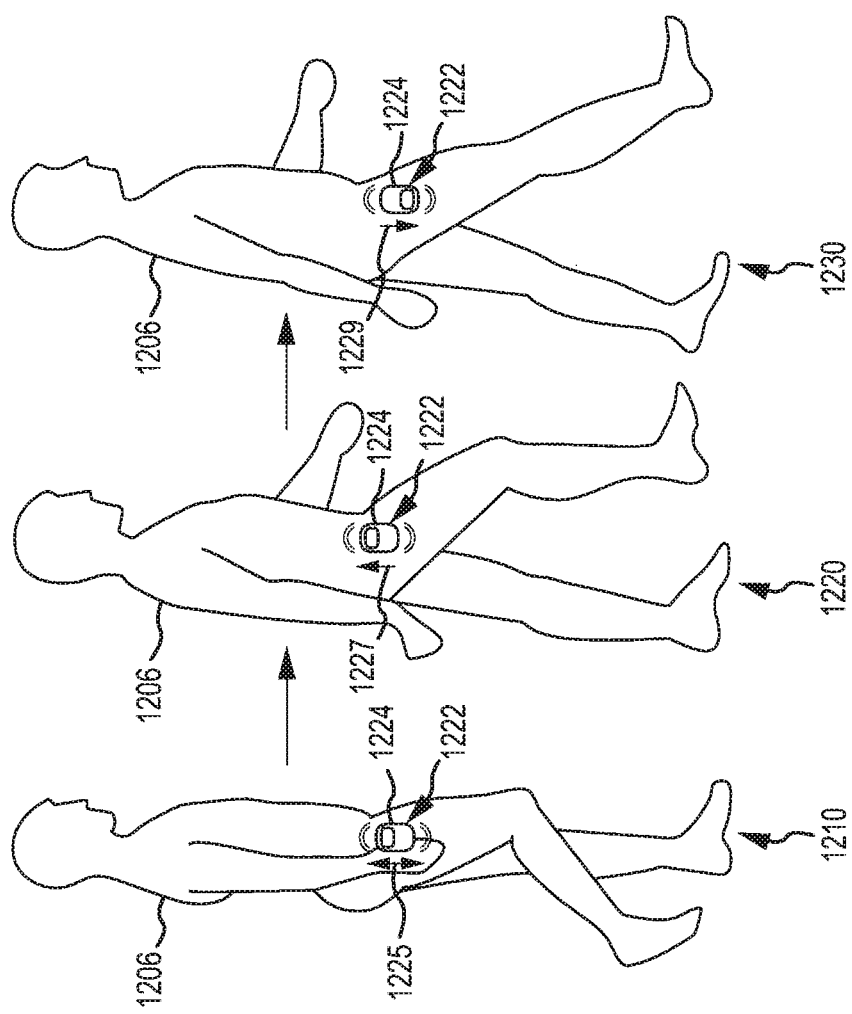
FIG. 12 illustrates in simplified form movement or oscillation of a generator battery within a generator barrel/bobbin during use for charging (e.g., for use during a typical daily activity like walking with a personal electronic device worn in a belt holster, carried in a user's pocket, or the like).

FIG. 12 schematically and in simplified form illustrates how a user/operator 1206 may perform a typical daily activity, such as walking as shown with positions 1210, 1220, and 1230, and cause a worn/carried charging assembly 1222 to generate electricity that can be used to charge a battery. FIG. 12 assumes that the assembly 1222 includes "magnetic springs" as discussed above, and these are useful for making the generator magnet 1224 "buoyant" so that very small motion (a user 1206 walking from position 1210 to 1230) creates oscillation 1225, 1227, 1229 of the generator magnet 1224 within the chamber of assembly 1224.

The generator magnet 1224 is housed inside the bobbin and battery assembly or charging assembly 1222. FIG. 12 illustrates the assembly 1222 as it may be typically used, e.g., housed inside a wearable consumer electronic device such cell phone that may be in a pocket, holster, or the like of user 1206. As shown at position 1210, the magnet oscillation 1225 is shown to be working with a simple motion such as walking. This oscillation 1225 of generator magnet 1224 is due, at least in part, to the inclusion of the magnetic springs (not shown in FIG. 12 but may take any of the forms discussed above with reference to the other figures). These magnetic springs create a neutrally buoyant environment in which the main generator magnet can freely oscillate 1225 with very little influence from gravity or friction within the barrel/bobbin's chamber. With the midstep in a walk cycle shown at 1220, the magnet 1224 oscillates 1227 up in the device 1222 passing through the copper windings of the coil on the bobbin. This creates energy that is stored in the storage battery of the device 1222 for later use by the electronic device that houses the charging assembly 1222. Then, with the downward step in the walk cycle shown at 1230, the generator battery 1224 is oscillated 1229 downward. The magnet 1224 again passes through the copper windings of the coil on the bobbin, which creates more energy or causes electricity to flow to the storage battery for later use.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In one implementation, a cylindrical battery replacement is provided that is adapted for kinetic energy-based recharging. The battery replacement includes a cylindrical battery housing including a positive and a negative electrical contact at opposite ends and with a sidewall defining a cylindrical interior space. The battery replacement further includes a battery assembly positioned within the cylindrical interior space. The battery assembly includes: (a) a rechargeable storage battery electrically connected to discharge current via the positive and negative electrical contacts of the battery housing; and (b) a charging assembly. The charging assembly includes: (a) a coil of copper wire electrically connected via an AC-to-DC converter to the rechargeable storage battery to provide DC current to the rechargeable storage battery; (b) an elongate permanent magnet with a polygonal cross section transverse to a longitudinal axis of the permanent magnet; and (c) a magnet housing with a chamber for receiving the permanent magnet and with a bobbin about which the copper wire of the coil is wound. In practice, the chamber includes a first space within the coil and a second space outside of the coil such that the permanent magnet travels between the first and second spaces when the battery housing is oscillated back and forth along a longitudinal axis of the battery housing.

In this exemplary implementation of the battery replacement, the second space may have a length of at least about a height of the permanent magnet. In some cases, the bobbin may have an outer surface with a cross sectional shape matching the polygonal cross section of the permanent magnet, whereby the coil has a non-cylindrical interior space through which the permanent magnet passes during the oscillation of the battery housing. Further, in some implementations, the coil includes at least 300 turns of the copper wire and the permanent magnet and the coil have substantially equal heights. The polygonal cross section may be a triangle, a rectangle, a square, or a hexagon. Further, the charging assembly may include at least one spring magnet at each end of the chamber, and each of the spring magnets may include a permanent magnet with a pole positioned relative to the chamber to provide a magnetic field repelling a magnetic field of the permanent magnet when the permanent magnet is proximate to the spring magnet.

Still further, in some implementations, the charging assembly has a ratio of at least about 50 percent of the permanent magnet to 50 percent of the coil by volume. The permanent magnet may be a non-cylindrical rare earth magnet with a Gauss rating of N42 to N52. In some cases, the charging assembly further includes copper, ceramic, or aluminum piezo elements at opposing ends of the chamber. Then, the piezo elements are wired in parallel with the copper wire of the coil to the AC-to-DC converter, whereby additional secondary energy is harvested to improve electrical output and power density. For example, the power density or the electrical output of the cylindrical battery replacement may be improved by at least about 6 percent.

What is claimed is:

1. A portable electronic device adapted for recharging during oscillating motion of the electronic device, comprising:
   a device housing including battery contacts of the electronic device; and
   a battery assembly supported by the device housing, the battery assembly comprising:
      a rechargeable storage battery connected to the battery contacts; and
      a charging assembly electrically connected to the rechargeable storage battery, the charging assembly including a kinetic energy-based generator operating during the oscillating motion of the electronic device to output electrical current to the rechargeable storage battery,
   wherein the kinetic energy-based generator includes:
      a barrel with a chamber extending a length of the barrel;
      only a single permanent magnet positioned in the chamber and sized and shaped to slide within the chamber during the oscillating motion; and
      a coil of electrically conductive wire wrapped around the barrel and the included chamber, wherein the single permanent magnet travels in and out of an interior region of the coil when it slides in the chamber and wherein, in response, the output electrical current is generated in the coil,
   wherein the single permanent magnet is positioned within the chamber with a single pair of opposing poles provided at first and second ends of the single permanent magnet being proximate to opposite ends of the chamber,
   wherein the single permanent magnet has a non-circular cross sectional shape in a plane transverse to an axis extending through both of the opposing poles, wherein the chamber has a non-circular cross sectional shape in a plane extending through a longitudinal axis of the chamber, and wherein the non-circular cross sectional shape of both the single permanent magnet and the chamber is a triangle or is a polygon with at least five sides.

2. The electronic device of claim 1, wherein the coil has a height as measured along an axis of the chamber and wherein the single permanent magnet has a height that is selected from the range of 70 to 100 percent of the coil height.

3. The electronic device of claim 1, wherein a maximum dimension of the non-circular cross sectional shape of the chamber has about 0.005 to 0.010 inches greater in magnitude than a corresponding maximum dimension of the non-circular cross sectional shape of the single permanent magnet.

4. The electronic device of claim 3, wherein the barrel has a sidewall defining the chamber and wherein the sidewall is formed of a nonferrous material that has a thickness along a bobbin section receiving the coil that is less than 1/32 inches thick.

5. The electronic device of claim 4, wherein the sidewall at the bobbin section has cross sectional shape taken transverse to the longitudinal axis of the chamber that is non-circular with corners and sides matching corners and sides of the chamber, whereby the coil has a first thickness proximate to one of the corners that is less than a second thickness proximate to one of the sides.

6. The electronic device of claim 1, wherein the chamber extends a portion of the length such that the single permanent magnet travels into a first void outside the interior region of the coil at one end of the coil and into a second void outside the interior region of the coil at a second end of the coil.

7. The electronic device of claim 1, wherein the kinetic energy-based generator further comprises spring magnets positioned at opposite ends of the chamber, the spring magnets each comprising magnets with poles arranged to oppose poles of the single permanent magnet in the chamber.

8. The electronic device of claim 1, wherein the conductive wire of the coil comprises at least 300 turns of No. 38 AWG or finer copper wire.

9. The electronic device of claim 8, wherein the coil has a height and the single permanent magnet has a height and gauss rating such that the output electrical current is at least 1300 mA at 3 or more volts when the oscillating motion comprises at least 1000 shakes of the electronic device.

10. A battery assembly for use in an electronic device, comprising:
a rechargeable storage battery;
a generator magnet comprising a non-cylindrical permanent magnet;
a magnet housing with an elongate chamber receiving the generator magnet, wherein the generator magnet is free to slide between a first position to a second position within the chamber,
a coil comprising electrically conductive wire wrapped about a bobbin portion of the magnet housing, wherein the coil is electrically connected to the rechargeable storage battery and outputs electricity to the rechargeable storage battery when the generator magnet slides between the first and second positions; and
at each end of the chamber, a magnetic spring comprising a pair of spaced apart permanent magnets each arranged with a pole facing into the chamber that matches a proximate pole of the generator magnet,
wherein the generator magnet has a non-circular cross sectional shape in a plane transverse to an axis extending through both of the opposing poles, wherein the chamber has a non-circular cross sectional shape in a plane extending through a longitudinal axis of the chamber, and wherein the non-circular cross sectional shape of both the single permanent magnet and the chamber is a triangle or is a polygon with at least five sides.

11. The battery assembly of claim 10, wherein the battery assembly has an external form factor matching a battery compartment of the electronic device, whereby the battery assembly is wholly positionable within the battery compartment and movement of the generator magnet from the first position to the second position is in response to movement of the electronic device.

12. The battery assembly of claim 10, wherein the conductive wire comprises No. 38 AWG or finer copper wire and the coil comprises at least 300 turns of the copper wire distributed along the bobbin portion.

13. The battery assembly of claim 12, wherein the permanent magnet has a height as measured along a longitudinal axis of the chamber that is selected from the range of 70 to 100 percent of a height of the coil as defined by the bobbin portion.

14. The battery assembly of claim 10, further comprising, in an electrical connection between the rechargeable storage battery and the coil, an AC-to-DC converter and a diode limiting current flow from the coil to the rechargeable storage battery.

15. A cylindrical battery replacement adapted for kinetic energy-based recharging, comprising:
a cylindrical battery housing including a positive and a negative electrical contact at opposite ends and with a sidewall defining a cylindrical interior space; and
a battery assembly positioned within the cylindrical interior space, the battery assembly including:
a rechargeable storage battery electrically connected to discharge current via the positive and negative electrical contacts of the battery housing;
a charging assembly including: only a single coil of copper wire electrically connected via an AC-to-DC converter to the rechargeable storage battery to provide DC current to the rechargeable storage battery; only a single elongate permanent magnet with a polygonal cross section transverse to a long axis of the permanent magnet; and a magnet housing with a chamber for receiving the permanent magnet and with a bobbin about which the copper wire of the coil is wound in a single direction, wherein the chamber includes a first space within the coil and a second space outside of the coil such that the permanent magnet travels between the first and second spaces when the battery housing is oscillated back and forth along a long axis of the chamber of the battery housing, wherein the polygonal cross section is a triangle or a hexagon.

16. The battery replacement of claim 15, wherein the second space has a length of at least a height of the permanent magnet.

17. The battery replacement of claim 15, wherein the bobbin has an outer surface with a cross sectional shape matching the polygonal cross section of the permanent magnet, whereby the coil has a non-cylindrical interior space through which the permanent magnet passes during the oscillation of the battery housing.

18. The battery replacement of claim 15, wherein the coil includes at least 300 turns of the copper wire and the permanent magnet and the coil have substantially equal heights.

19. The battery replacement of claim 15, wherein the charging assembly further comprises at least one spring magnet at each end of the chamber, each of the spring magnets comprising a pair of spaced apart permanent magnets each with a pole positioned relative to the chamber to provide a magnetic field repelling a magnetic field of the permanent magnet when the permanent magnet is proximate to the spring magnet.

20. The battery replacement of claim 15, wherein the permanent magnet is a non-cylindrical rare earth magnet with a Gauss rating of N42 to N52.

21. The battery replacement of claim 15, the charging assembly further comprising copper, ceramic, or aluminum piezo elements at opposing ends of the chamber.

22. The battery replacement of claim 21, wherein the piezo elements are wired in parallel with the copper wire of the coil to the AC-to-DC converter, whereby additional secondary energy is harvested to improve electrical output and power density.

23. The battery replacement of claim 22, wherein the power density or the electrical output of the cylindrical battery replacement are improved by at least 6 percent.

\* \* \* \* \*